Figure 3:
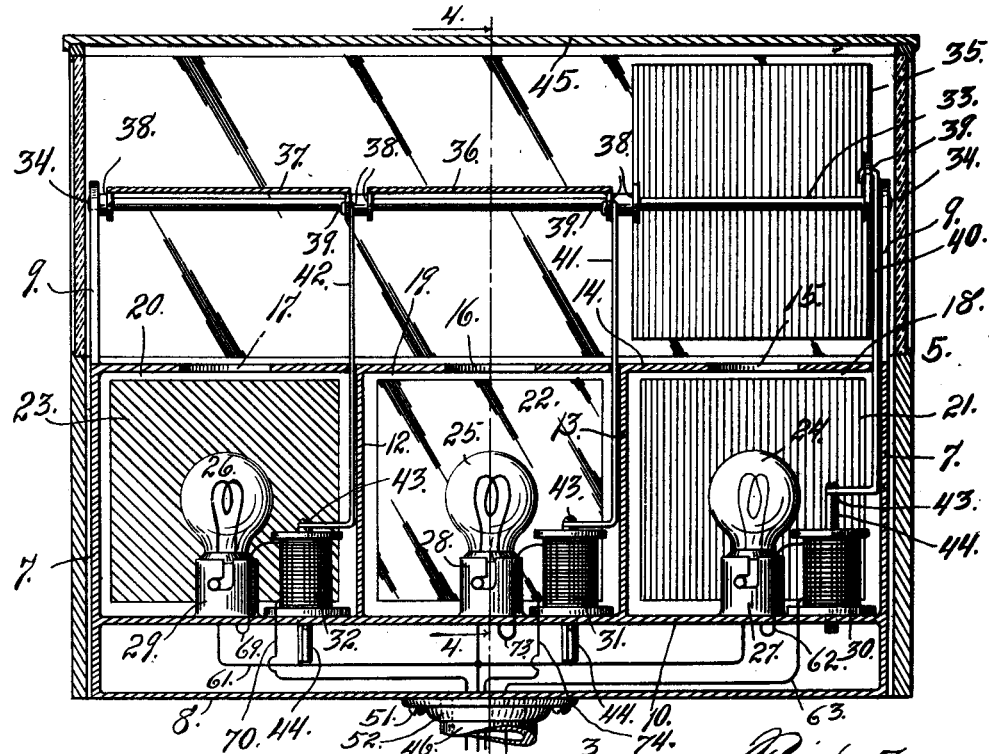

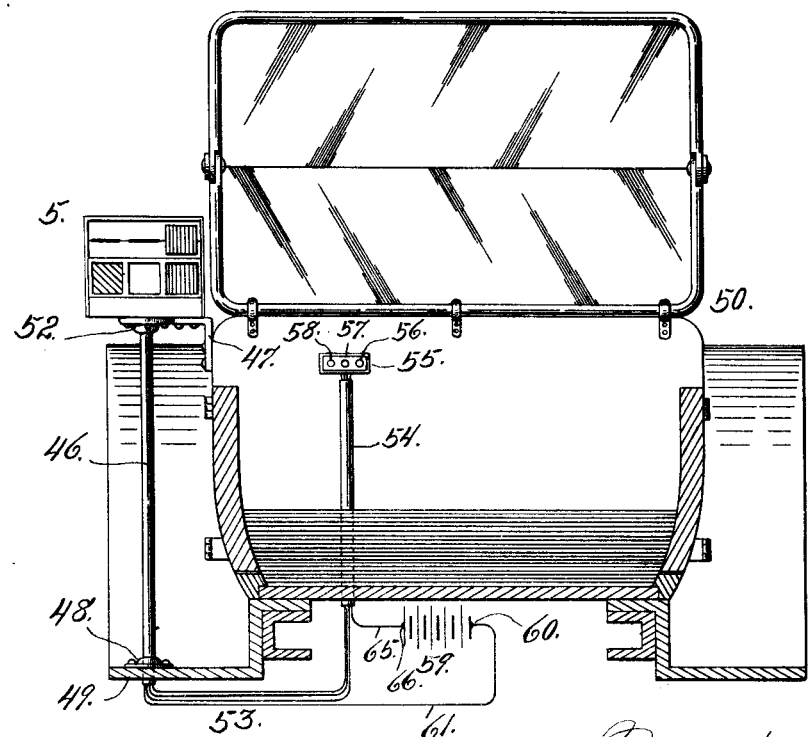
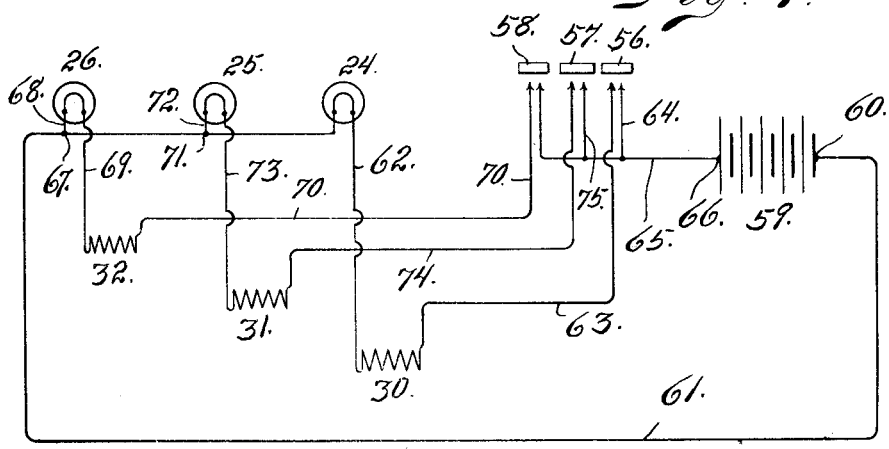

E. T. SHERMAN.
AUTOMOBILE SIGNAL.
APPLICATION FILED APR. 12, 1915.

1,198,671.

Patented Sept. 19, 1916.
2 SHEETS—SHEET 2

Witnesses
Otto E. Hoddick.
L. E. Petersen.

Inventor
Edward T. Sherman.
By
Attorney

UNITED STATES PATENT OFFICE.

EDWARD T. SHERMAN, OF DENVER, COLORADO, ASSIGNOR TO THE SHERMAN-CRANE AUTOMOBILE SIGNAL COMPANY, OF DENVER, COLORADO, A CORPORATION OF COLORADO.

AUTOMOBILE-SIGNAL.

1,198,671.   Specification of Letters Patent.   Patented Sept. 19, 1916.

Application filed April 12, 1915. Serial No. 20,632.

*To all whom it may concern:*

Be it known that I, EDWARD T. SHERMAN, a citizen of the United States, residing in the city and county of Denver and State of Colorado, have invented certain new and useful Improvements in Automobile-Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in automobile signals, my object being to provide a construction adapted to be mounted upon an automobile and by virtue of which the chauffeur may conveniently give signals indicating the direction in which the machine will travel, the invention being more especially intended for signaling with reference to turns either to the right or left from the straight course in which the machine is going. This invention, however, possesses additional features whereby additional signals may be given to indicate that the machine will continue its travel forwardly, or that it will make a half-turn and then travel in the opposite direction. This object is accomplished through the medium of three signals, one to designate the turn to the right, one to designate a turn to the left and a third to indicate that the machine will continue straight ahead. Again by combining the right-hand signal with the straight ahead signal, a half-turn to the right, to enable the machine to travel in the opposite direction, will be indicated; while by combining the left-hand signal with the straight ahead signal, a half-turn to the left in order to enable the machine to travel in the opposite direction, will be indicated. Again, by operating all of the signals at once, the chauffeur will indicate that he is about to stop the machine. The movable signals preferably consist of metal plates, which are colored red, green and white, respectively. The red signal indicates a right-hand turn, the green signal a left-hand turn and the white signal that the machine will continue straight ahead. By combining the red and white, or operating them both at the same time, a half circle turn to the right is indicated; while by operating the green and white simultaneously, a half turn to the left is indicated, the stop being indicated by operating the red, green and white signals simultaneously. These signals are preferably electrically operated and are used in connection with incandescent lamps which are in the same circuit as the electromagnetic devices which serve to operate the movable signals. The lamps are valuable for night use, since independently of the lamps, the movable signals will not be conspicuous in the night. As illustrated in the drawing, the movable signals are arranged within a case having plain glass in both the front and rear thereof. Normally, these signals, which consist of relatively thin plates, are held in their horizontal position by actuated rods, so that they are practically invisible, since only their thin edges are presented to view. Below these movable signals and arranged in three distinct compartments, are incandescent lamps which are arranged in the respective circuits of the electromagnetic devices for operating the movable signals. The tops of the compartments in which the lamps are located are provided with openings whereby the light from the lamps may strike the movable signals, thus making the latter more conspicuous and making the signals doubly effective for night use.

Having briefly outlined my improved construction, I will proceed to describe the same in detail, reference being made to the accompanying drawing, in which is illustrated an embodiment thereof.

Figure 4:
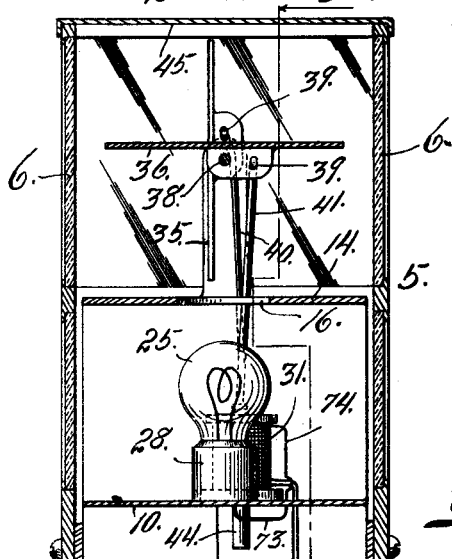

In this drawing,—Figure 1 is a cross section taken through the tonneau of an automobile equipped with my improved signal. This view is taken forward of the dash board and wind shield, which appear in elevation. Fig. 2 is a diagrammatic view illustrating the circuits employed in connection with the signals. Fig. 3 is a sectional detail view illustrating the operating features of the signal, the parts being shown on a much larger scale than in Fig. 1. This is a section taken on the line 3—3, Fig. 4, looking toward the left. Fig. 4 is a section taken on the line 4—4, Fig. 3, looking toward the right.

The same reference characters indicate the same parts in all the views.

Let the numeral 5 designate an outer casing adapted to slip over and inclose the supporting structure for the signal proper. The upper part of this casing in which the movable signals are located, is equipped with plain glass plates 6 in front and rear while the lower part in which the lamps are located is equipped with red, white and green plates or areas, respectively, in order that the lamps when lighted may indicate the three signals heretofore explained.

The supporting structure within the outer casing, consists of a skeleton framework provided with closed sides 7; a bottom 8; arms 9 extending upwardly from the sides 7 to which they are attached; a horizontal partition 10 located a short distance above the bottom 8; vertical partitions 12 and 13 dividing this support into three compartments, designated 18, 19 and 20, respectively. These compartments, so far as the support is concerned, are open at the front and rear, but the casing 5 is provided in both front and rear of these respective compartments, with red, white and green colored plates or areas, the same being designated 21, 22 and 23, respectively. Hence, when the support is taken in connection with the outer casing, the compartments 18, 19 and 20 are virtually closed on all sides by the front and rear closures, consisting of plates or areas properly colored to give the desired signaling effect when lamps, which are designated 24, 25 and 26, respectively, are lighted. These lamps are arranged within the respective compartments and as illustrated in the drawing, are inserted in sockets 27, 28 and 29 which are fast upon the partition or plate 10 of the interior supporting structure. Adjacent these lamps are arranged solenoids 30, 31 and 32, respectively, which are in the same circuits with the lamps.

The arms 9 of the supporting structure extend above the side members 7 and are centrally located thereon. Supported by these arms is a rod 33, whose extremities are mounted in the upper ends of the arms as shown at 34. Upon this rod are pivotally mounted three signal plates which are designated 35, 36 and 37, respectively. Each of these plates is provided with a pair of perforated ears 38 through which the rod 33 passes. These plates are colored red, white and green respectively, and to one ear of each plate is connected as shown at 39, the upper extremity of a rod, the three rods being designated 40, 41 and 42, respectively. The lower extremities of these rods are connected as shown at 43 with the movable cores or armature 44 of the solenoids 30, 31 and 32. When these solenoids are deënergized, their cores or armatures are in the lowermost position and act to maintain the plates with which the rods 40, 41 and 42 are respectively connected, in the horizontal position. However, as soon as the solenoids are energized or the electric current is passed through their coils, their armatures will move upwardly as shown at the left in Fig. 3, whereby the rods connected with the respective plates 35, 36 and 37 are actuated to throw these plates to the vertical position as shown at the right in Fig. 3, thus displaying the plates and giving the required signal. The plate 35 is colored red, the plate 36 white, and the plate 37 green, to correspond with the front and rear plates or areas 21, 22 and 23, respectively, of the outer casing and which are arranged in both the front and rear of the compartments 18, 19 and 20, in which the lamps 24, 25 and 26 are respectively located. By reason of the openings 15, 16 and 17, in the partition 14, the light from the lamps 24, 25 and 26 may shine upon the signal plates 35, 36 and 37, respectively, in order to make the movable signals more conspicuous and effective for signaling purposes when thrown to the vertical position.

The outer casing 5 is open at the bottom and closed at the top, its top plate being designated by the numeral 45. By reason of this bottom opening, this casing may be readily applied and removed in order to give access to the signaling mechanism carried by the supporting structure which is located within the casing 5 as heretofore explained.

The supporting structure is rigidly mounted on the machine 50 by means of a vertical tube 46 and an angle bracket 47. The tube 46 is secured at its lower extremity as shown at 48 to the foot board 49 of the machine on one side. To the upper extremity of this tube is made fast the supporting structure by passing fastening devices as screws 51, through the tube flange 52 and into the bottom plate 8 of the signal support. The tube 46 is continued through the foot board 49 and forms a conduit for the series 53 of electric conductors which are employed in operating the signals. As shown in the drawing, these conductors, after leaving the lower extremity of the tube 46, are carried upwardly through a stationary tube 54 and arranged to coöperate with a plate 55 provided with three push buttons 56, 57 and 58. When the structure is mounted as shown in Fig. 1, and as heretofore explained, the signals as they are given are equally visible from both the front and rear of the machine, since the structure of the support is open in the front and rear, while the casing is equipped for this purpose, as heretofore explained. As shown in the drawing, if the push button 56 is pressed, the lamp 24 will be lighted and the red signal plate 35 actuated, whereby it is thrown to a vertical position (see Fig. 3). Again, if the push button 58 is pressed, the lamp 26 will be lighted and the green signal plate 37 thrown to the vertical position; if the push button 57 is pressed, the lamp 25 will be lighted and the white plate 36 thrown to the vertical position; if the two buttons 56 and 57 are pressed, two lamps 24 and 25 will be lighted and the red and white signal-plates 35 and 36 will be simultaneously thrown to the vertical position; if the two buttons 57 and 58 are simultaneously pressed, the white plate 36 and the green plate 27 will be thrown to the vertical position; and finally, if all three buttons are simultaneously pressed, the three lamps will be lighted and the three signal plates 35, 36 and 37 will be thrown to the vertical position. The lighting of the lamp 24 and the throwing of the red plate 35 to the vertical position indicates that the machine is about to make a right-hand turn; the lighting of the lamp 26 and the throwing of the green plate 37 to the vertical position indicates that the machine is about to make a left-hand turn. The lighting of the lamp 25 and the throwing of the plate 36 to the vertical position indicates that the machine is to continue straight ahead. The lighting of the two lamps 24 and 25 and the throwing of the two plates 35 and 36 to the vertical position simultaneously, indicates that the machine is to make a half circle turn to the right in order that it may travel in the opposite direction from that in which it is going. The lighting of two lamps 25 and 26 and the throwing of the plates 36 and 37 to the vertical position indicates a half-circle turn to the left; while the lighting of all the lamps and simultaneously throwing the three plates 35, 36 and 37 to the vertical position indicates that the machine is about to stop.

The circuits in which the lamps are located and in which the coils of the solenoids 30, 31 and 32 are located, will now be described, reference being made more particularly to Fig. 2 of the drawing. In this view, the numeral 59 designates a source of current, as a battery carried by the machine equipped with my improved signal. The small rectangular designs at the upper right hand part of this signal indicate the push buttons 56, 57 and 58, corresponding with the reference characters given these same buttons in Fig. 1. The wire coils at the lower left hand portion of the view, represent the solenoids and are given the same reference characters, namely, 30, 31 and 32, respectively; while the incandescent lamps 24, 25 and 26 are indicated at the upper left hand portion of the view and designated by the same reference characters as employed in Figs. 3 and 4. When the push button 56 is pressed (see Fig. 2), the circuit may be closed through the coils of the solenoid 30 and the lamp 24, and the current may be said to pass from the pole 60 of the battery through a conductor 61, through the lamp 24, thence through a conductor 62 to the coils of the solenoid 30, thence through a conductor 63 to the push button 56, thence through a conductor 64 to a conductor 65 and thence to the opposite pole 66 of the battery, completing the circuit, since the pressing of the push button bridges the space between the conductors 63 and 64 at their arrow point extremities, which are arranged just below the button. By pressing the push button 58 (see Fig. 2), the circuit is closed through the solenoid 32 and the lamp 26, and the current may be said to pass from the pole 60 of the battery through the conductor 61 to a point 67, thence to a conductor 68 to the lamp 26, thence through a conductor 69 to the solenoid 32, thence through a conductor 70 to the push button 58 and thence through the conductor 65 to the pole 66 of the battery. Again, if the push button 57 is pressed, the circuit may be again closed through the lamp 25 and the solenoid 31, and the current may be said to pass from the pole 60 of the battery through the conductor 61 to a point 71, thence through a conductor 73 to the solenoid 31, thence through a conductor 74 to the push button 57, thence through a conductor 75 to the conductor 65, and thence to the opposite pole 66 of the battery. It is evident that by pushing any two of these buttons, or all of them simultaneously, the results heretofore explained will take place, and therefore it is not thought necessary to explain the operation more in detail.

Attention is called to the fact that instead of employing plates or areas 21, 22 and 23 of different colors in the front and rear of the lamp compartments, continuous plates or areas of plain or frosted glass may be utilized, in which event, I will use lamps 24, 25 and 26 having bulbs of different colors, as red, white and green, respectively, which of course, will obviate the necessity of employing different colored plates or areas of glass, as illustrated in the drawing and as heretofore explained.

Having thus described my invention, what I claim is,—

A signaling device, comprising a supporting structure, a horizontal partition providing upper and lower compartments, vertical partitions dividing the lower compartment into three separate compartments, pivoted signaling plates independently supported in the upper compartment and normally maintained in a horizontal position, a lamp in each of the three lower compartments, an outer casing provided with plain glass front and rear plates adjacent the upper compartment and further provided with separately colored front and rear glass plates for each of the lower compartments, electrically operated means for causing any of the signal plates to move into a vertical position and simultaneously lighting the corresponding lamp, the pivoted signaling plates being supported directly above the lamp compartments, and said horizontal partition being provided with openings whereby as the plates and lamps are simultaneously operated the light from the latter is directed against said plates.

In testimony whereof I affix my signature in presence of two witnesses.

EDWARD T. SHERMAN.

Witnesses:
  MAZE KIRBY,
  A. EBERT O'BRIEN.

Copies of this patent may be obtained for five cents each, by addressing the "Commissioner of Patents, Washington, D. C."